Patented June 24, 1924.

1,499,025

UNITED STATES PATENT OFFICE.

FRITZ MOELLER, OF CASSEL, GERMANY.

PROCESS OF TREATING CELLULOSE.

No Drawing. Application filed August 2, 1920. Serial No. 400,830.

*To all whom it may concern:*

Be it known that I, FRITZ MOELLER, a citizen of Germany, residing at Cassel, Germany, have invented certain new and useful Improvements in the Processes of Treating Cellulose; and I do hereby declare the following to be a full, clear, and exact description of the invention, such as will enable others skilled in the art to which it appertains to make and use the same.

My invention relates to improvements in the process of treating cellulose, substances and fabrics containing cellulose, and cellulose derivates, and the products obtained thereby. The object of the improvements is to treat the said substances in such a way that they are wetted by water only with difficulty and that they are water proof.

I have discovered, that the above named matters are made water proof and hardened by treating the same with suitable compounds containing chlorid and sulfur, and more particularly with thionylchloride $SOCl_2$ or oxychloride of sulfur. Therefore my invention consists in treating with such compounds pure cellulose, such as cotton, cellulose made from wood, and products made therefrom, paper and card board either sized or unsized, or provided with filling matter or other substances, spun matter and fabrics made from fibre containing cellulose, such as cotton, ramie, linen, flax, hemp, artificial silk, etc., furthermore, vegetable substances, such as wood, cork, straw, vegetable raw fibre such as jute, hemp, flax, and the like. Similar results are obtained by applying the process to cellulose derivates, such as oxy- and hydrocellulose, and similar substances such as starch and dextrine, and to substances or fabrics treated or impregnated therewith.

In the practical operation of the process, the matter to be treated, for example, paper, is subjected a short time and either at normal or elevated temperature to the action of diluted solutions of thionylchloride or oxychloride of sulfur in indifferent solvents, such as chloroform, carbon tetrachloride $CCl_4$, bisulphide of carbon, benzol, and when treating with oxychloride of sulfur, the product is in some cases treated with a suitable solvent for sulfur. To avoid any injury to the paper by the action of the acid I prefer to wash the product with water or diluted alkalies or to neutralize the dry product with gaseous ammonia. By thus treating the paper or other matter I obtain a product which is with difficulty wetted by water and which is impermeable to water. Furthermore the paper is hardened by the process. The paper is turned by performing the new process in this manner in some way into a matter similar to parchment, with the difference, however, that the material so treated remains porous.

Better results as to impermeability to water are obtained by a modification of the process which consists in first thoroughly drying the paper, fabric, etc., or extracting the same with water for removing hygroscopic salts and other matter attracting moisture, and treating the same at normal or elevated temperature and during a few seconds or minutes with vaporous thionylchloride or oxychloride of sulfur. Thereafter the matter is treated in the manner described with reference to the first example of the process. By the process a paper is obtained which is with difficulty wetted and which is impermeable to water. It has in a high degree the properties of sized paper, ink does not flow out and is not imbibed by the paper. The paper receives a coating which is not affected by light, cold and hot water, diluted alkalies and organic solvents.

To substances containing cellulose which have been subjected to my improved process, a surface parchmentization can be given by treating the said substances with concentrated sulfuric acid or other solvents for cellulose such for example as chloride of zinc, whereupon the coating of hydratecellulose or amyloid obtained thereby is treated with thionylchloride or chloride of sulfur, preferably in a gaseous or vaporous state. The matter (particularly paper) which has thus been treated is impermeable to fat and water.

As is known, thionylchlorid sulphur is fourvalent and it should therefore be understood that my invention is restricted to the use of sulphur less than sixvalent.

I claim:

1. The herein-described process which consists in treating cellulose-containing material with thionylchloride.

2. The herein-described process which consists in treating cellulose-containing material with thionylchloride in an indifferent solvent.

3. The herein-described process which consists in treating cellulose-containing material with thionylchloride and thereafter removing the acid therefrom.

4. The herein-described process which consists in treating cellulose-containing material with thionylchloride in a vaporous state.

5. The herein-described process which consists in treating cellulose-containing material with thionylchloride in a vaporous state and thereafter removing the acid therefrom.

6. The herein-described process which consists in treating material containing dried cellulose with thionylchloride in a vaporous state and thereafter removing the acid therefrom.

7. The herein-described process which consists in treating cellulose-containing material with thionylchloride in a vaporous state and thereafter washing the same with a fluid containing water.

8. The herein-described process which consists in treating cellulose-containing material with a compound containing sulphur less than hexavalent and chlorine.

9. The herein-described process which consists in treating cellulose-containing material with a compound containing sulphur less than hexavalent and chlorine in an indifferent solvent.

10. The herein-described process which consists in treating cellulose-containing material with a gaseous compound containing sulphur less than hexavalent and chlorine.

11. The herein-described process which consists in treating cellulose-containing material with a compound containing sulphur less than hexavalent and chlorine and thereafter removing the acid therefrom.

12. The herein-described process which consists in treating cellulose-containing material with a compound containing sulphur less than hexavalent and chlorine and thereafter removing the acid and sulphur therefrom.

13. The herein-described process which consists in treating cellulose-containing material with a compound containing sulphur less than hexavalent and chlorine and thereafter washing the same with a fluid containing water.

14. The herein-described process which consists in treating cellulose-containing material with a compound containing sulphur less than hexavalent and chlorine and thereafter washing the same with a fluid containing water and an alkali.

15. The herein-described process which consists in treating cellulose-containing material with a compound containing sulphur less than hexavalent and chlorine and thereafter washing the same with a fluid containing water and ammonia.

16. The herein-described process which consists in treating cellulose-containing material with a compound containing quadrivalent sulphur and chlorine.

17. The herein-described process which consists in treating cellulose-containing material with a compound containing quadrivalent sulphur, chlorine and oxygen.

18. The herein-described process which consists in treating cellulose-containing material with a gaseous compound containing quadrivalent sulphur and chlorine.

19. The herein-described process which consists in treating cellulose-containing material with a gaseous compound containing quadrivalent sulphur, chlorine and oxygen.

20. The herein-described process which consists in treating cellulose-containing material with thionylchloride in a vaporous state and thereafter washing the same with a fluid containing water and alkali.

21. The herein-described process which consists in treating cellulose-containing material with thionylchloride in a vaporous state and thereafter washing the same with a fluid containing water and ammonia.

22. The herein-described process which consists in treating material containing dried cellulose with a compound containing sulphur less than hexavalent and chlorine.

23. The herein-described process which consists in treating material containing dried cellulose with a gaseous compound containing sulphur less than hexavalent and chlorine.

24. The herein-described process which consists in treating material containing dried cellulose with a compound containing quadrivalent sulphur, chlorine and oxygen.

25. The herein-described process which consists in treating material containing dried cellulose with a gaseous compound containing quadrivalent sulphur, chlorine and oxygen.

26. The herein-described process which consists in treating material containing dried cellulose with thionylchloride.

27. The herein-described process which consists in treating material containing dried cellulose with thionylchloride in a vaporous state.

28. The herein-described process which consists in treating material containing dried cellulose with thionylchloride in a vaporous state and thereafter washing the same with a fluid containing water.

29. The herein-described process which consists in treating material containing dried cellulose with thionylchloride in a vaporous state and thereafter washing the same with a fluid containing water and an alkali.

30. The herein-described process which consists in treating material containing dried cellulose with thionylchloride in a vaporous state and thereafter washing the same with a fluid containing water and ammonia.

In testimony wherof I hereunto affix my signature in the presence of two witnesses.

Dr. FRITZ MOELLER.

Witnesses:
GEORGE SIPPEL,
HEINRICH BACHMANN.